United States Patent
Shaffer et al.

(10) Patent No.: US 7,274,291 B2
(45) Date of Patent: Sep. 25, 2007

(54) DYNAMIC AND HYBRID RFID

(75) Inventors: Shmuel Shaffer, Palo Alto, CA (US); Gebran Chahrouri, Menlo Park, CA (US); Shantanu Sarkar, San Jose, CA (US); Labhesh Patel, Mountain View, CA (US); Joseph Khouri, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 136 days.

(21) Appl. No.: 11/097,056

(22) Filed: Apr. 1, 2005

(65) Prior Publication Data

US 2006/0220856 A1    Oct. 5, 2006

(51) Int. Cl.
G08B 1/08 (2006.01)

(52) U.S. Cl. .............................. 340/539.26; 340/10.41; 340/505

(58) Field of Classification Search ............. 340/572.1, 340/572.4, 539.1, 539.26–539.29, 505, 10.1, 340/10.4, 10.41, 870.16, 870.17, 5.92; 705/28; 235/385
See application file for complete search history.

(56) References Cited

U.S. PATENT DOCUMENTS

| | | | |
|---|---|---|---|
| 5,103,210 A * | 4/1992 | Rode et al. ............... | 340/572.3 |
| 5,339,073 A | 8/1994 | Dodd et al. | |
| 5,818,340 A * | 10/1998 | Yankielun et al. ...... | 340/539.26 |
| 5,850,187 A | 12/1998 | Carrender et al. | |
| 5,887,176 A | 3/1999 | Griffith et al. | |

(Continued)

OTHER PUBLICATIONS

International Search Report dated Feb. 17, 2006, from related International Application No. PCT/US05/15322, 5 pp. including Notification of Transmittal (CISCP378WO).

(Continued)

*Primary Examiner*—Thomas Mullen
(74) *Attorney, Agent, or Firm*—Beyer Weaver LLP

(57) ABSTRACT

Disclosed is an active or dynamic RFID tag that actively provides current status information regarding a particular item, as well as mechanisms for recognizing dynamic RFID information read from such RFID tag. Static identifying information regarding the particular item is provided either by the same active/dynamic RFID tag or by a different passive RFID tag. While the RFID tag may passively or actively provide general identification, the RFID actively provides status information that corresponds to changes in the corresponding item's status. In a first implementation, active RFID tags are positioned next to one or more components within a system so that each active RFID tag is powered and transmitting its RFID information when its corresponding component is operational. In contrast, each active RFID tag is positioned so that it is not powered and not transmitting its RFID information when its component is failing. Accordingly, an RFID reader can then know when a system has a failing component when a one of the component's corresponding active RFID tag is not transmitting its RFID information. In this first implementation, the active RFID either transmits or fails to transmit based on its component's status state. In a second implementation, a dynamic RFID is associated with a specific component, set of components, or system, and the dynamic RFID tag dynamically provides an RFID reader with RFID information that changes with its associated item's changing status state. The status state may correspond to any suitable parameter of the item or product that can change over time. Thus, the dynamic RFID provides different transmission frequencies based on different status states of its component or system.

18 Claims, 9 Drawing Sheets

U.S. PATENT DOCUMENTS

| | | | | |
|---|---|---|---|---|
| 5,963,134 | A * | 10/1999 | Bowers et al. | 340/572.1 |
| 6,232,870 | B1 * | 5/2001 | Garber et al. | 340/572.4 |
| 6,553,489 | B1 | 4/2003 | Osler et al. | |
| 6,563,417 | B1 * | 5/2003 | Shaw | 340/572.1 |
| 6,677,857 | B2 * | 1/2004 | Bara et al. | 340/572.1 |
| 2002/0154029 | A1 * | 10/2002 | Watters et al. | 340/870.16 |
| 2003/0146836 | A1 * | 8/2003 | Wood | 340/540 |
| 2004/0049428 | A1 * | 3/2004 | Soehnlen et al. | 705/25 |
| 2004/0061655 | A1 * | 4/2004 | Forster et al. | 340/10.41 |
| 2005/0171738 | A1 * | 8/2005 | Kadaba | 702/187 |

OTHER PUBLICATIONS

Written Opinion of the International Searching Authority dated Feb. 17, 2006, from related International Application No. PCT/US05/15322, 3 pp. (CISCP378WO).

"*EPCgl, Frequently Asked Questions*", Retrieved from the internet: http://www.epcglobalinc.com/about/faqs.html, [Retrieved Mar. 24, 2005], 9 pages.

"*EPC™ Tag Data Standards Version 1.1 Rev.1.24*", EPCglobal, Standard Specification, Apr. 1, 2004, 78 pages.

"*The Global Language of Business*", Retrieved from the internet: http://www.ean-int.org/locations.html, [Retrieved Mar. 24, 2005], 5 pages.

M. Kanellos, "*Newsmaker: Making sense of sensors*", CNET News. com: news.com.com/Making+sense+of+sensors/ 2008-1082_3-5829415.html, published: Aug. 12, 2005.

* cited by examiner

DYNAMIC AND HYBRID RFID

BACKGROUND OF THE INVENTION

The present invention relates to radio frequency identification ("RFID") technology. More specifically, it relates to the RFID tags that are used on each product or set of products to uniquely identify such product or products.

Bar codes containing a Universal Product Code ("UPC") have become a nearly ubiquitous feature of modern life. The vast majority of products, as well as packages, containers and other elements in the stream of commerce now bear a bar code to allow for convenient tracking and inventory control.

However, bar codes have some drawbacks. Bar codes are "read only," in that they are merely a printed set of machine-readable parallel bars that cannot be updated. Bar codes cannot transmit information, but instead must be read by a scanner. Bar codes must be scanned within a relatively short distance and must be properly oriented for the bar code to be read.

"Smart labels," generally implemented by RFID tags, have been developed in an effort to address the shortcomings of bar codes and add greater functionality. RFID tags have been used to keep track of items such as airline baggage, items of clothing in a retail environment, cows and highway tolls. As shown in FIG. 1, an RFID tag 100 includes surface area 105 and antenna 110. In this example, RFID tag 100 is activated by a magnetic field 145 generated by an RFID reader 125. The tag's antenna 110 picks up the magnetic signal 145. Conventional RFID tags are passive and are generally configured with a particular surface area for reflecting back the magnetic signal at a particular modulation. That is, RFID tag 100 modulates the signal 145 according to information coded in surface area 105 and reflects the modulated signal 155 back to the RFID reader 125.

RFID tags use the Electronic Product Code ("EPC" or "ePC") format for encoding information. An EPC code includes variable length bits of information (common formats are 64, 96 and 128 bits), which allows for identification of individual products as well as associated information. As shown in FIG. 1, EPC 120 includes header 130, EPC Manager field 140, Object class field 150 and serial number field 160. EPC Manager field 140 contains manufacturer information. Object class field 150 includes a product's stock-keeping unit ("SKU") number. Serial number field 160 is a 40-bit field that can uniquely identify the specific instance of an individual product i.e., not just a make or model, but also down to a specific "serial number" of a make and model.

In general, existing RFID tags are passive filters that represent a sequence of numbers based on the frequencies they reflect. Said in another way, each item's RFID tag bounces back a certain frequency that corresponds to the item's identification. Conventional RFID tags have specific patterned surface areas that are designed to reflect specific frequency ranges. Thus, when a reader sweeps within a plurality of different frequency ranges, the reader will receive a reflected signal when a particular RFID matches one of the frequency ranges. The obtained reflected signal's particular frequency modulation then corresponds to particular information, such as serial and model number, for a particular RFID.

Although conventional RFID work well in particular applications, the RFID information of each tag is static and cannot change over time. Thus, any parameter of the corresponding product (such as operational status) cannot be dynamically included in the conventional passive RFID tag.

In view of the above, there is a need for improved RFID tags that dynamically specify changing information, such as operational status, regarding its associated product. Additionally, there is a need for mechanisms for reading and managing dynamic RFID tags.

SUMMARY OF THE INVENTION

Accordingly, the present invention includes an active or dynamic RFID tag that actively provides current status information regarding a particular item, as well as mechanisms for recognizing dynamic RFID information read from such RFID tag. Static identifying information regarding the particular item is provided either by the same active/dynamic RFID tag or by a different passive RFID tag. While the RFID tag may passively or actively provide general identification, the RFID actively provides status information that corresponds to changes in the corresponding item's status. In a first implementation, active RFID tags are positioned next to one or more components within a system so that each active RFID tag is powered and transmitting its RFID information when its corresponding component is operational. In contrast, each active RFID tag is positioned so that it is not powered and not transmitting its RFID information when its component is failing. Accordingly, an RFID reader can then know when a system has a failing component when a one of the component's corresponding active RFID tag is not transmitting its RFID information. In this first implementation, the active RFID either transmits or fails to transmit based on its component's status state. In a second implementation, a dynamic RFID is associated with a specific component, set of components, or system, and the dynamic RFID tag dynamically provides an RFID reader with RFID information that changes with its associated item's changing status state. The status state may correspond to any suitable parameter of the item or product that can change over time. Thus, the dynamic RFID provides different transmission frequencies based on different status states of its component or system.

In one embodiment, an apparatus for dynamically conveying a status state of a system is disclosed. The apparatus includes one or more active radio frequency identification (RFID) tags. Each active RFID tag is positioned with respect to a corresponding one of the system's electrically powered components so that each active RFID tag transmits a particular frequency when the corresponding component is operating and does not transmit the particular frequency when the corresponding component is failing to operate. Transmission or failure of transmission of each RFID tag indicate the system's status state.

In a specific implementation, the apparatus further includes a passive RFID tag that corresponds to the systems identity. In another aspect, each active RFID is positioned in a power path of its corresponding component. In an alternative aspect, each active RFID is not physically tied to a power line of its corresponding component, wherein each active RFID includes a coil that is continually responsive to an RF signal output by its corresponding component when the component is operational.

In another embodiment, an apparatus for dynamically transmitting a status state of an item is disclosed. The apparatus includes a radio frequency (RF) transmitter for dynamically outputting a selected one of a plurality of frequencies, one or more processors, and one or more memory, wherein at least one of the processors and memory are adapted for (i) determining a status of the item and (ii) configuring the RF transmitter to output a selected one of the plurality of frequencies based on the determined status of the item. In a further aspect, the apparatus also includes an RF scan sensor for determining whether the item is being scanned by a radio frequency identification (RFID) reader. The at least one of the processors and memory are further adapted for determining whether the item is being scanned by an RFID reader, and the status of the item is only determined and the RF transmitter is only configured when it is determined that the item is being scanned.

In a specific implementations, the RF transmitter is a plurality of piezoelectric devices or a tunable oscillator. In another aspect, the memory includes a Device Status and RFID Table that lists a plurality of status states that each correspond to a particular RFID, and the RF transmitter is configured with an RFID that corresponds to a status from the Table matching the determined status of the item. In yet another aspect, the at least one of the processors and memory are adapted for configuring the RF transmitter to output a plurality of selected frequencies selected from the plurality of frequencies based on the determined status of the item. In another embodiment, the RF transmitter includes a plurality of coils tuned to different frequencies and configuring the RF transmitter is accomplished by applying power to a selected one of a plurality of coils associated with the item, wherein each item coil triggers a different one of the RF transmitter's coils.

In one embodiment, the invention pertains to a method of dynamically conveying a status state of an item. A status state of the item is determined. An RF transmitter is then configured to transmit a selected one of a plurality of frequencies based on the determined status state of the item. In a further aspect, it is determined whether the item is being scanned by an RFID reader, and the status of the item is only determined and the RF transmitter is only configured when it is determined that the item is being scanned. In one aspect, configuring the RF transmitter is accomplished by (i) comparing the determined status state to a plurality of reference status states that each correspond to a specific RFID, and (ii) when a match is found between the determined status state and the reference status state, configuring the RF transmitter with the RFID corresponding to the matching reference status state.

In another embodiment, an apparatus for dynamically tracking a status state of an item is disclosed. This apparatus includes a first radio frequency (RF) radio for outputting a plurality of frequencies, a second RF radio for receiving one or more scanned frequencies from an item, one or more processors, and one or more memory. At least one of the processors and memory are adapted for (i) scanning a proximate item with an radio frequency identification (RFID) reader to obtain an RFID, (ii), comparing the obtained RFID to stored reference RFID's, and (iii) determining the status state of the scanned item based on the comparison. In one aspect, the stored reference RFID's were previously obtained using an RFID reader to scan a plurality of items having known status states.

In another aspect, the invention pertains to a method for dynamically tracking a status state of an item. A proximate item is scanned with an radio frequency identification (RFID) reader to obtain an RFID. The obtained RFID is compared to stored a plurality of reference RFID's. The status state of the scanned item is then determined based on the comparison. In a specific aspect, the stored reference RFID's were previously obtained using an RFID reader to scan a plurality of items having known status states.

These and other features and advantages of the present invention will be presented in more detail in the following specification of the invention and the accompanying figures which illustrate by way of example the principles of the invention.

DETAILED DESCRIPTION OF SPECIFIC EMBODIMENTS

Reference will now be made in detail to a specific embodiment of the invention. An example of this embodiment is illustrated in the accompanying drawings. While the invention will be described in conjunction with this specific embodiment, it will be understood that it is not intended to limit the invention to one embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Figure 2:
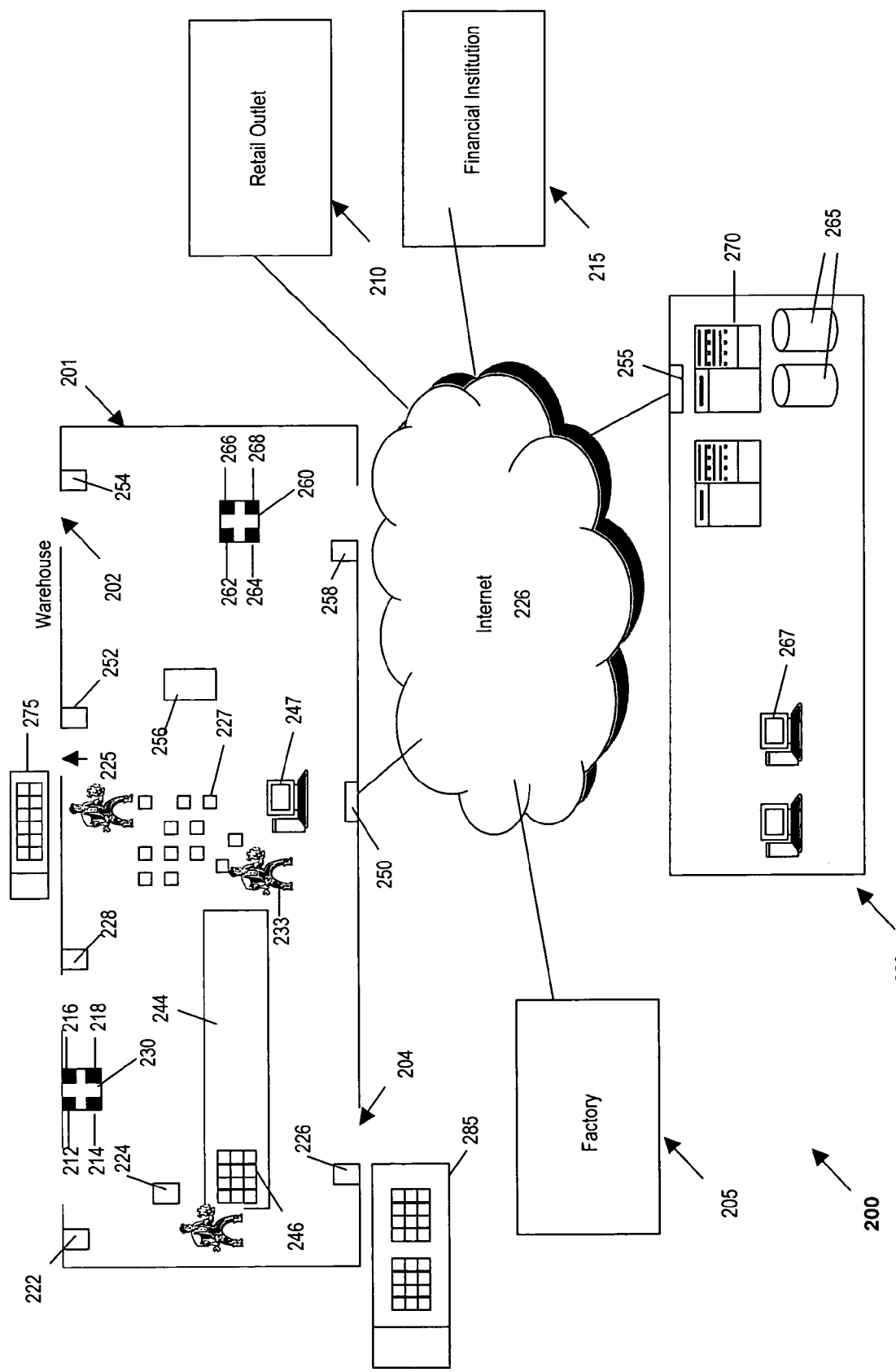
FIG. 2 is a diagrammatic representation of an example RFID network in which embodiments of the present invention may be implemented.

FIG. 2 is a diagrammatic representation of an example RFID network in which embodiments of the present invention may be implemented. Here, RFID network 200 includes warehouse 201, factory 205, retail outlet 210, financial institution 215 and headquarters 220. As will be appreciated by those of skill in the art, network 200 could include many other elements and/or multiple instances of the elements shown in FIG. 2. For example, network 200 could include a plurality of warehouses, factories, etc.

In this illustration, products 227 are being delivered to warehouse 201 by truck 275. Products 227, which already include RFID tags, are delivered through door 225. In this example, RFID reader 252 is connected to port 262 of switch 260. Here, switches 230 and 260 are connected to the rest of RFID network 200 via gateway 250 and network 226. Network 226 could be any convenient network, but in this example network 226 is the Internet. RFID reader 252 reads each product that passes through door 225 and transmits the EPC code corresponding to each product on RFID network 200.

RFID tags may be used for different levels of a product distribution system. For example, there may be an RFID tag for a pallet of cases, an RFID tag for each case in the pallet and an RFID tag for each product. Accordingly, after products 227 enter warehouse 201, they are assembled into cases 246. RFID printer 256 makes an RFID tag for each of cases 246. In this example, RFID printer 256 is connected to port 266 of switch 260. RFID printer 256 could operate under the control of PC 247 in warehouse 201, one of PCs 267 in headquarters 220, or some other device.

RFID reader 224, which is connected to port 214, reads the EPC code of each case 246 and product 227 on conveyor belt 244 and transmits this information on network 200. Similarly, RFID reader 226, which is connected to port 216, reads the EPC code of each case 246 and product 227 that exits door 204 and transmits this information on network 200. Cases 246 are loaded onto truck 285 for distribution to another part of the product chain, e.g., to retail outlet 210.

As each RFID reader 224 scans the proximate RFID(s), the scanned RFID information may then be transmitted to any number of PC's (e.g., 267) and/or servers (e.g., 270). As shown, headquarters 220 includes a plurality of PC's 267, servers 270, and associated databases 265. RFID handling tasks may be logically distributed among a plurality of PC's and/or servers or performed by a single computer system. In one specific implementation, one of the computer systems serves as a Savant system (e.g., 267) for receiving the scanned RFID's. The Savant system sends a query to an Object Name Service (ONS) server and its associated ONS database (e.g., 270 and 265). The ONS server matches the received EPC number to the address of a server which has extensive information about the product. This information that corresponds to the received EPC number can then be accessed by the Savant system for any suitable type of processing as further described below. Additionally, the Savant system may be configured to initiate storage of new or updated EPC numbers in the ONS Server's database.

U.S. patent application Ser. No. 11/010,089, filed Dec. 9, 2004 and entitled "Methods and Devices for Providing Scalable RFID Networks" and U.S. patent application Ser. No. 10/866,285, filed Jun. 9, 2004 and entitled "Methods and Devices for Assigning RFID Device Personality" (collectively, the "RFID Network Applications") contain background material regarding RFID networks and are herein incorporated by reference.

In the present invention, active or dynamic RFID tags are used to directly specify any environmental changes with respect to a particular system or set of components of a system or specify any other types of changes in one or more item's status. In other words, when an active or dynamic RFID tag of the present invention is scanned, it specifies by its RFID a parameter of its corresponding item, such as whether the item is operational or failing. This specified RFID changes dynamically as the parameter of the item changes. Passive RFID tags may also be used in conjunction with active and/or dynamic RFID tags.

Figure 3A:
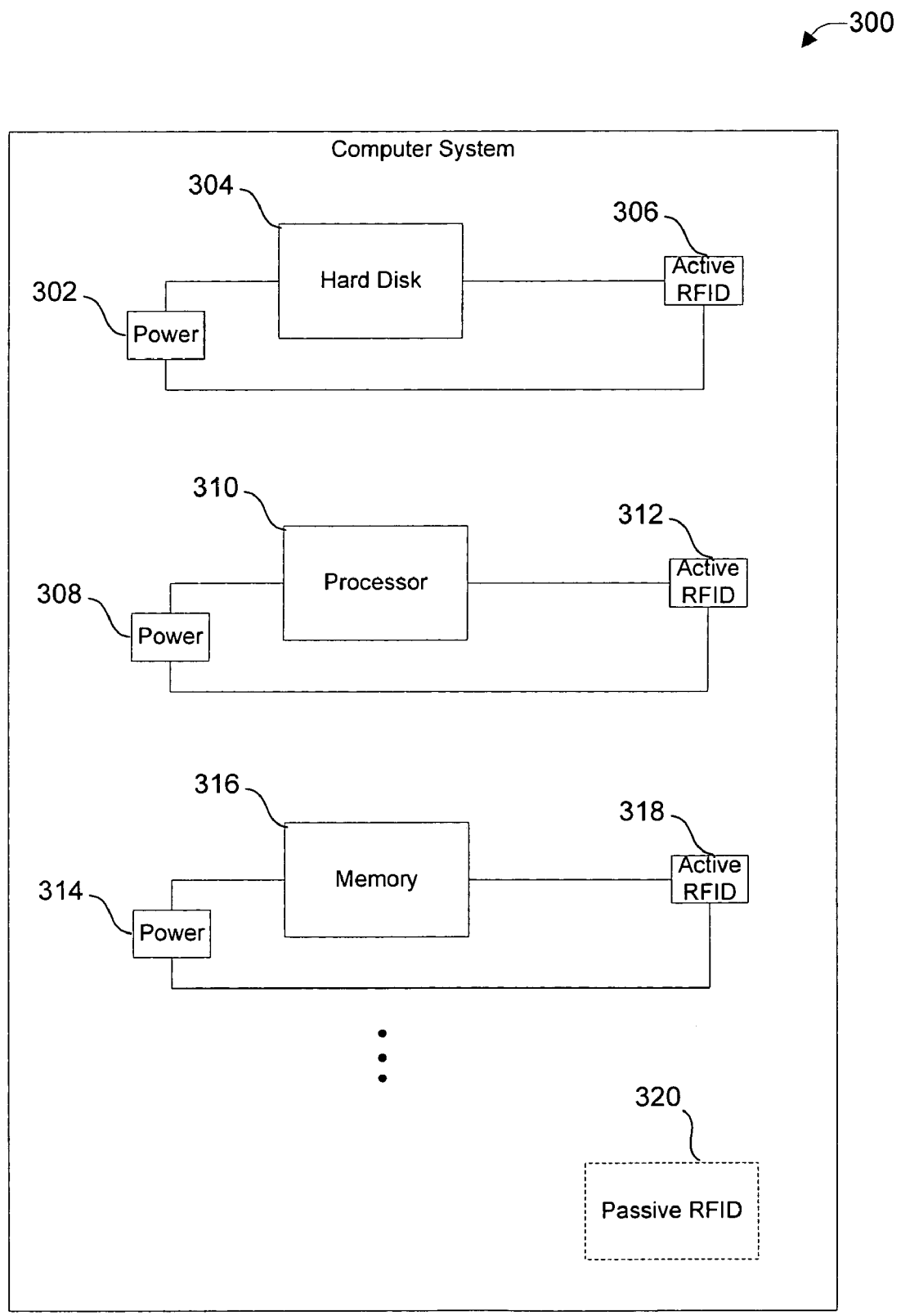
FIG. 3A is a diagrammatic representation of a system having a plurality of operational components that each has an associated active RFID tag in accordance with a specific implementation of the present invention.

In one embodiment, an active RFID tag is coupled with a component's power and transmits only when the component is operational. FIG. 3A is a diagrammatic representation of a system 300 having a plurality of operational components that each has an associated active RFID tag in accordance with a specific implementation of the present invention. In this illustration, the system 300 is in the form of a computer system, although the present invention may be applied to any suitable system or item. The system or item may include one or more operational components. In the example of FIG. 3, the computer system 300 includes a hard disk 304, processor 310, and memory 316. Of course, the computer system 300 would typically include several other operational components that are not illustrated to simplify description of the present invention.

In this implementation, active RFID tags are used to detect operational status of one or more components. In general, an active RFID tag transmits RFID information when it is powered, but fails to transmit such RFID information when it is not powered. A voltage controlled oscillator (VCO) may be used to implement an active RFID that transmits when powered and does not transmit when not powered. A VCO that transmits a particular frequency that corresponds to a specific RFID value when it receives a voltage input may be utilized. An active RFID tag's transmission can signal that its corresponding component is operational, while failure of transmission can specify that its corresponding component is failing. In other words, the active RFID tags provide rough trouble-shooting of a system component's status. Techniques for scanning such active RFID tags are further described below.

As shown in FIG. 3A, an active RFID tag is coupled within the power path of each of these components so that failure of a component affects its corresponding active RFID tag's transmission. Active RFID tag 306 is coupled with hard disk component 304 and power supply 302; active RFID tag 312 is coupled with processor component 310 and power supply 308; and RFID tag 318 is coupled with memory component 316 and power supply 314. The passive RFID 320 is not connected to the power line and it requires the RF power from the RFID reader in order to become operational.

In alternative embodiments, the active RFID is not physically connected to its corresponding component's power line. For example, a component may include its own RF source that transmits when the component is powered. The RF source of the component acts as the first half of a transformer, while the active RFID serves as the second half the transformer. In one implementation, the RF source is a coil and the active RFID is a coil that is tuned to the RF output of the component's RF source. When the component is powered, its RF source transmits an RF signal that is picked up by the active RFID and causes the RFID to transmit its RFID information.

Active RFID tags may be coupled with any number and type of components within a particular system. Additionally, each active RFID tag may be positioned in any suitable manner so that a corresponding component's operational status affects transmission of the tag's RFID information. When a system is configured with several active RFID tags, the RFID tags will together produce a different signature when one or more of the components is failing vs. when all the components are operational. This fact may be used to determine the system's overall component status as further described below.

The position of each active RFID tag with respect to the system components varies widely depending on the exact configuration of each component's hardware. In one design, one may simply place an active RFID within a position that would normally contain an LED for displaying operational status of the component. In other words, an active RFID tag replaces an LED of each component that is on when the component is operational and off when the component is failing. In an alternative design, the active RFID tag is placed in series with a fuse or surge protector. These designs are merely exemplary and are not meant to limit the scope of the invention.

Figure 3B:
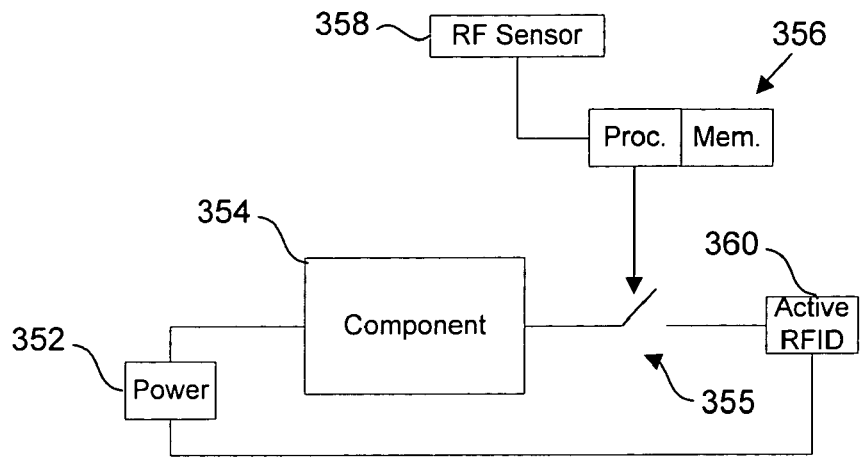
FIG. 3B illustrates a controlled active RFID tag in accordance with a specific implementation.

In this implementation, the active RFID tags transmit continuously as long as they have power. Alternatively, a controller may be provided to switch in the component's power to each active RFID tag when the system is scanned by an RFID reader. This type of "controlled" active RFID tag feature may be implemented by any suitable combination of hardware and/or software. FIG. 3B illustrates a controlled active RFID tag in accordance with a specific implementation. As shown, an active RFID tag 360 is switched on or off from the power path of a component 354 by a controller 356 (e.g., processor and memory). The controller 356 is configured (or programmed) to close switch 355 so that power from the component (via power supply 352) is supplied to active RFID tag 360 (at least when the component 354 is operational), and the controller 356 is also configured to open the switch 355 so that power is withdrawn from the active RFID tag 360. Controller 356 can be configured to close the switch when RF sensor 358 detects that an RFID reader is scanning and open the switch when RF sensor 358 fails to detect an RFID reader scan, or visa versa. The RF sensor 358 may take any suitable form, such as an antenna tuned to a particular range of frequencies.

Figure 3C:
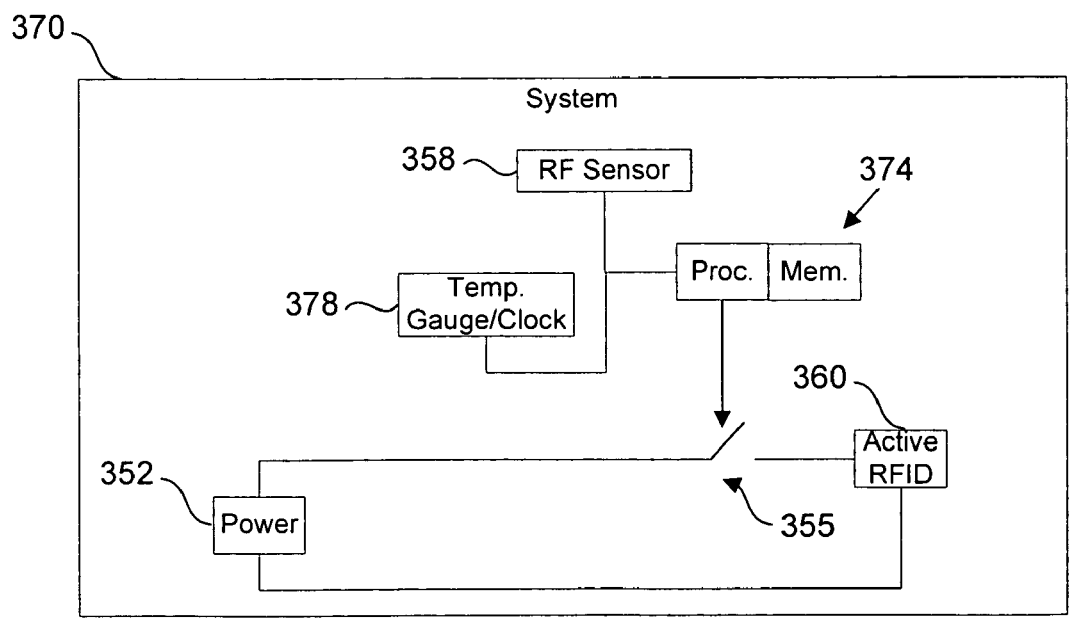
FIG. 3C illustrates a controlled active RFID tag that transmits based on an environmental parameter of an item in accordance with a specific implementation.

In another implementation, an active RFID tag may be used to transmit or not transmit based on any suitable environmental parameter of an item, besides component operational status. For example, the active RFID tag may be coupled with a temperature gauge of the item and when the gauge gets above (or below) a particular threshold, power is removed from the active RFID tag. FIG. 3C illustrates a controlled active RFID tag that transmits based on an environmental parameter of a system, item or component in accordance with a specific implementation. As shown, system 370 includes power supply 352 coupled with active RFID tag 360 through switch 355. Components of FIG. 3C may operate the same as similarly labeled components of FIG. 3B.

However in this implementation, controller 374 operates to control switch 355 so that power is supplied to active RFID tag 360 when it is being scanned by an RFID reader and when an environmental parameter reaches a predetermined threshold. For example, the controller 374 may be coupled with an RF sensor 358 for detecting an RF scan and an environmental gauge 378, such as a temperature sensor for indicating temperature of the item or clock for indicating passage of time for the item. For example, when the item reaches a particular temperature, this status change may be indicated by the active RFID tag by either closing or opening the switch 355 that supplies power to the tag. In other words, the active RFID tag transmits when the sensed parameter reaches a specified threshold, while the tag fails to transmit when the threshold is not reached, or visa versa. This status information obtained by recognizing that tag transmission is present or absent may be useful in indicating spoilage of a particular type of item, such as a perishable food item. Likewise, a clock may be used to indicate a lifetime of a component. For instance, when a particular amount of time has passed, the controller may be configured to either open or close the switch 355.

Figure 1:
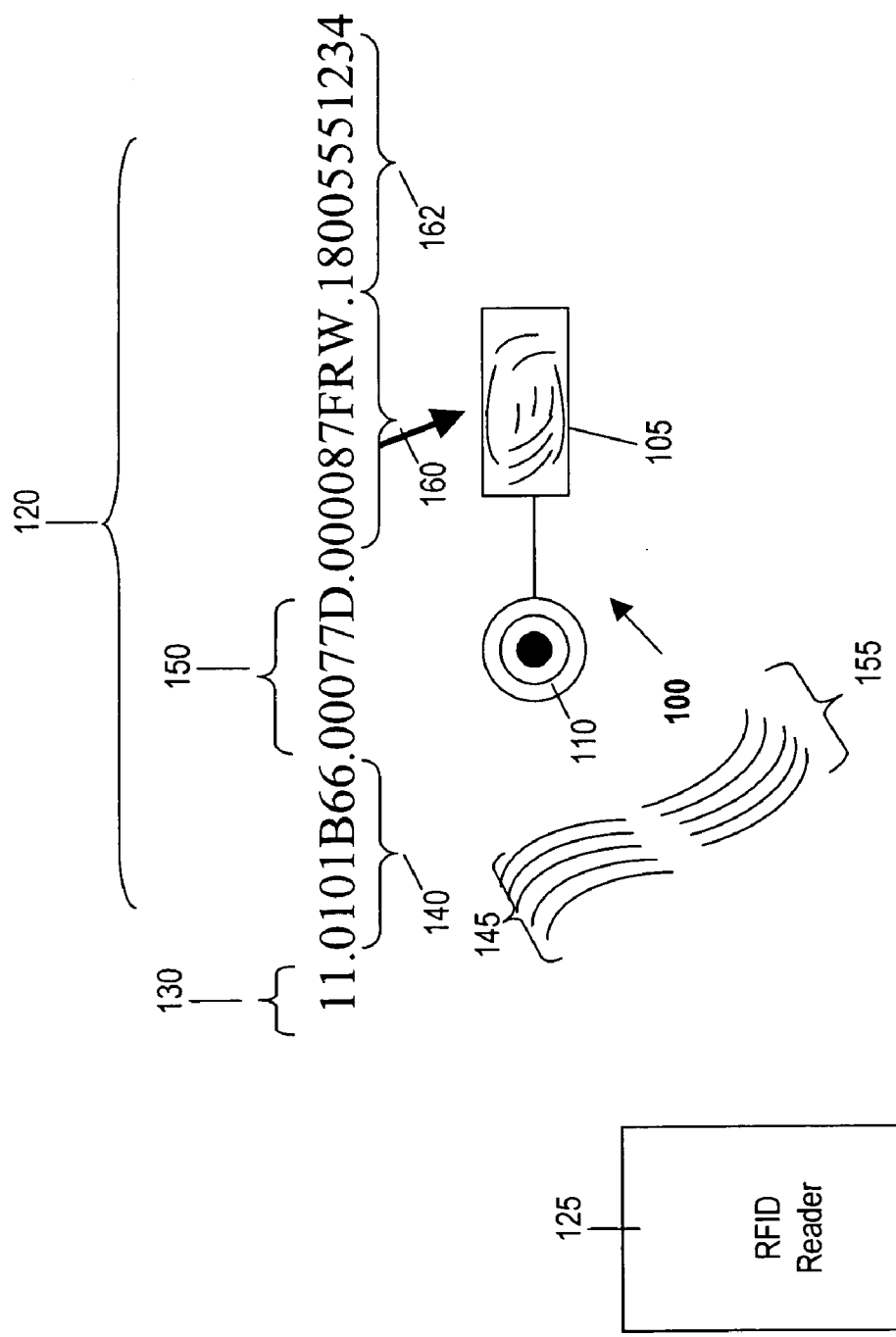
FIG. 1 is a diagrammatic representation of a passive RFID tag.

Any of the systems or items of FIGS. 3A through 3C may optionally include one or more passive RFID tags (e.g., one for each component and one for the system) for conveying fixed RFID information, such as model and serial number. For example, a passive RFID tag 320 is shown for the system of FIG. 3A. This passive RFID tag may be similar to the one described with respect to FIG. 1. As described above, passive RFID generally include a specifically configured surface area that reflects specific frequencies, and these reflected frequencies correspond to fixed information, such as a product's model number and serial number. One or more active RFID tags of a system or component may also or alternatively transmit both a fixed RFID information portion and a dynamic RFID portion.

Figure 4:
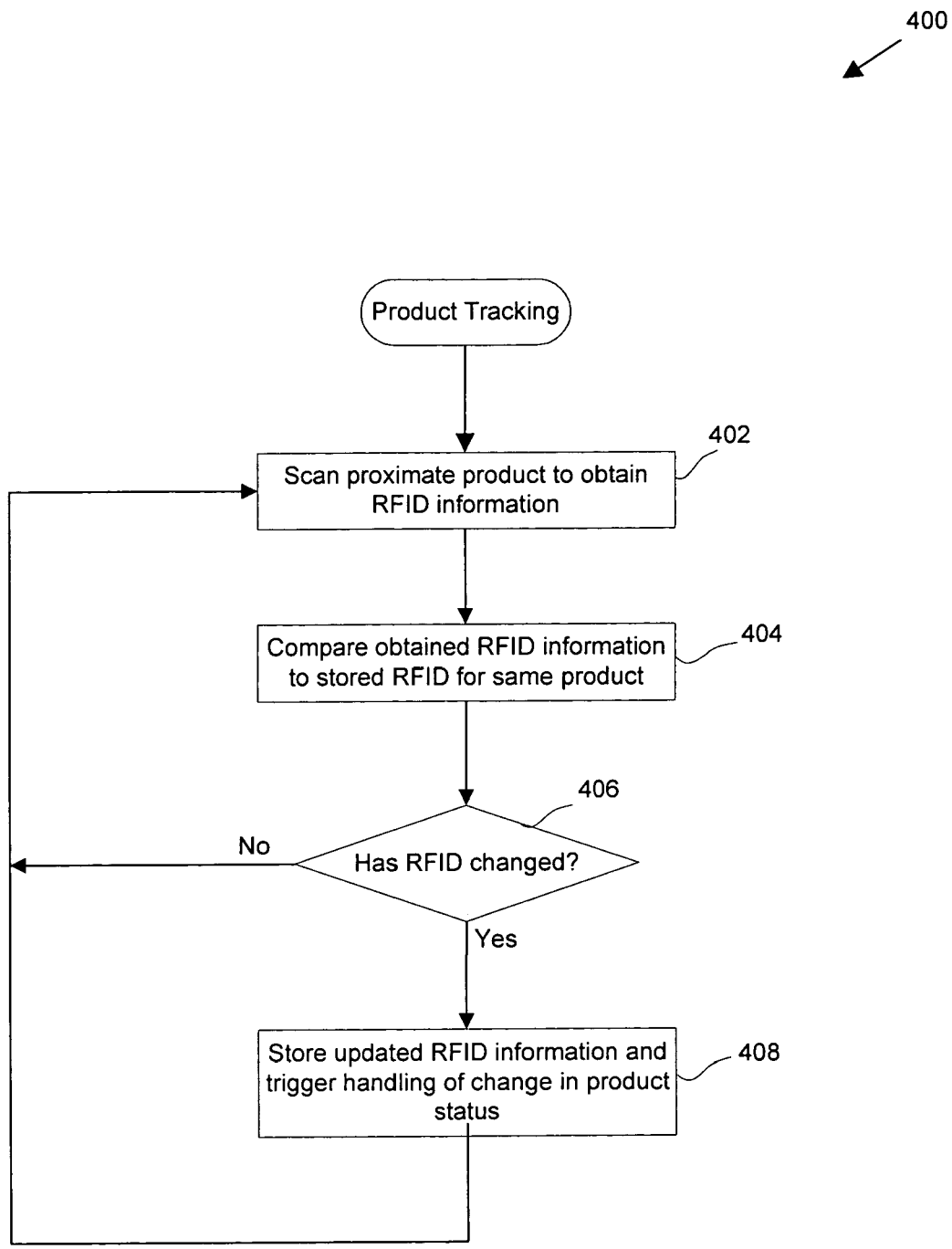
FIG. 4 is a flowchart illustrating a procedure for tracking an item's status in accordance with one embodiment of the present invention.

FIG. 4 is a flowchart illustrating a procedure 400 for tracking a product's or item's status in accordance with one embodiment of the present invention. This procedure may, for example, be implemented within an RFID reader or a computer system to which the RFID reader communicates scanned RFID information. Initially, a proximate product is scanned to obtain its RFID information in operation 402. The obtained RFID information is then compared to stored RFID information for the same product in operation 404. In one embodiment, the scanned RFID information is compared to an ONS database (e.g., 265 of FIG. 2). The ONS database can include any stored RFID information, such as RFID values scanned from a perfectly functioning product, as well as various sets of RFID information scanned from various types of failing items or systems in different stages of failure, for example. That is, the ONS may be configured with any suitable reference RFID information for a particular item, where each different reference RFID for a particular item corresponds to a different status state of such item. For instance, a table may be used to store reference RFID information and corresponding status states. This table may be searched for a reference RFID that matches the scanned RFID. The matching reference RFID and its associated reference status state then indicates the status state of the scanned item. In a specific example, a scanned RFID may have a first frequency that differs from a second frequency. A table may list the first frequency as corresponding to an operational state, while listing the second frequency as corresponding to a failing state. Thus, when a first frequency is obtained from the scanned item, it is determined that the corresponding scanned item is operational. In contrast, a scanned second frequency leads one to determine that the scanned item is failing.

It may then be determined whether the RFID information has changed (e.g., status has changed) in operation 406. For example, each scanned RFID may be stored for each item and when a currently scanned RFID changes from the previous scanned RFID for such item, it is determined that a change in status has occurred. If no change has occurred, the procedure for product tracking repeats. If the RFID has changed, the updated RFID may then be stored and handling of the change in product status may then be triggered in operation 408. For example, a system that has a failing component may then be analyzed to determine the root cause and then repair. In another example, where it is determined that the item has spoiled (e.g., the item is a perishable food item) or failed beyond repair (e.g., the item is an operational component), the item may then be discarded or recycled. The procedure for product tracking repeats. The status change handling operations may occur prior to or in conjunction with repeating the procedure 400 for tracking items.

Figure 5:
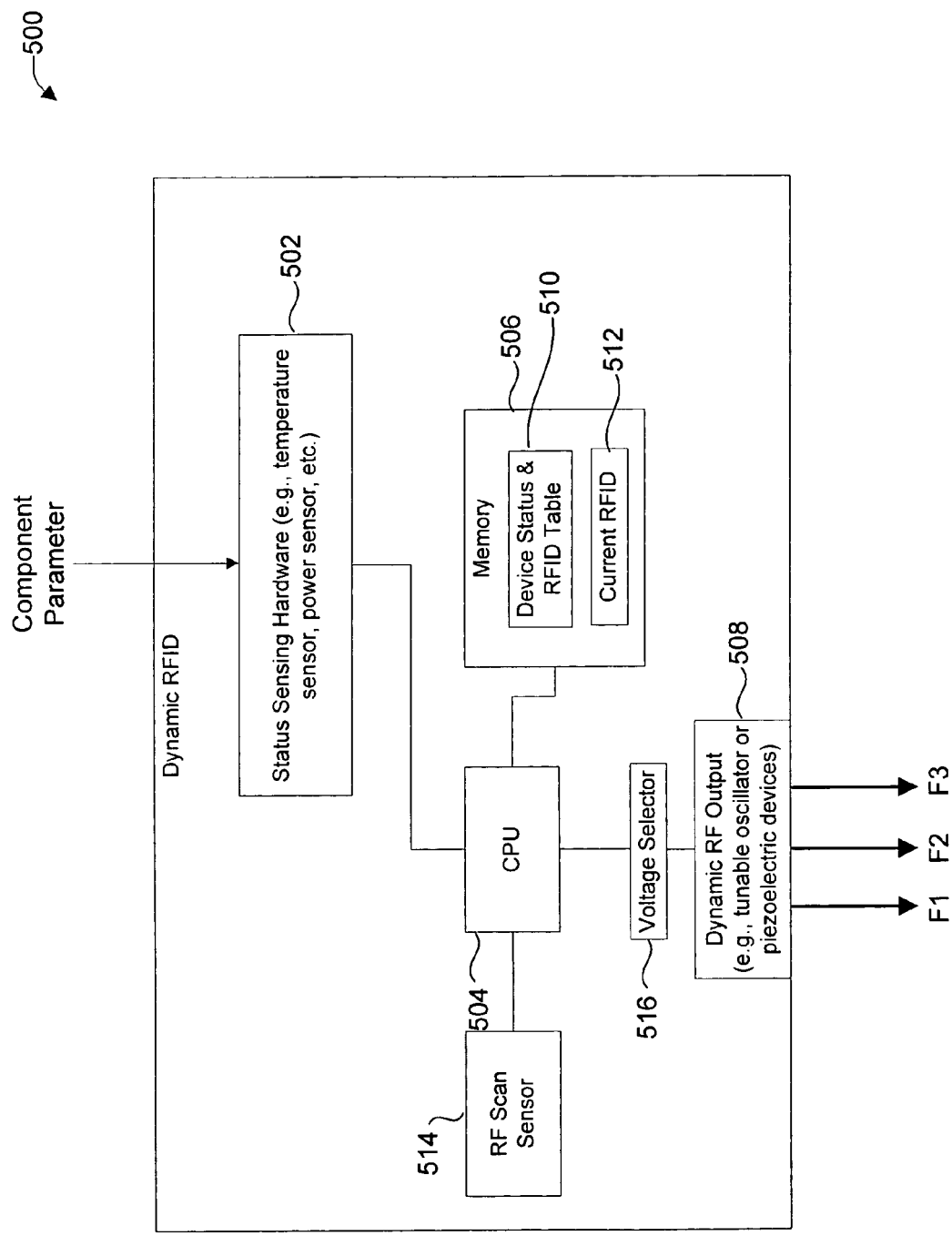
FIG. 5 is a diagrammatic representation of a dynamic RFID configuration in accordance with an alternative embodiment of the present invention.

In another embodiment, dynamic RFID tags may be used to indicate status state changes in an item and communicate such status state changes by transmitting (or reflecting) different frequencies to the RFID reader. FIG. 5 is a diagrammatic representation of a dynamic RFID tag 500 in accordance with an alternative embodiment of the present invention. As shown, the dynamic RFID tag 500 includes Status Sensing Hardware 502 for sensing one or more parameters of the associated component (or system or item). The dynamic RFID tag 500 also includes one or more processors 504 and one or more memory 506 which are together configured (or programmed) to implement transmission of different frequencies based on the sensed component parameter as further described below.

The dynamic RFID tag may also include any suitable mechanisms for selectively outputting one of a plurality of different frequencies. In the illustrated embodiment, the dynamic RFID tag includes a voltage selector 516 for selecting a specific voltage that is then input into a Dynamic RF output 508, which then outputs a specific frequency (e.g., F1, F2, or F3) based on the input voltage. The dynamic RFID tag 500 may also include an RF Scan Sensor 514 for detecting when the dynamic RFID tag is being scanned, for example, by an RFID reader.

The Dynamic RF Output 508 may take any suitable form, such as a plurality of piezoelectric devices or a tunable oscillator (e.g., VCO). A piezoelectric device generally has both a mechanical axis and an electrical axis. If voltage is applied on the mechanical axis, the mechanical axis bends in a predetermined manner. A plurality of piezoelectric device can be used to achieve a unique surface area for reflecting a unique RF modulation. One may use a plurality of piezoelectric devices arranged in any suitable fashion with respect to each other to obtain a plurality of different surface areas to achieve reflection of different frequencies. The different frequencies can then correspond to different status states of the corresponding component or item. The Dynamic RF Output 508 may be configured to output a single selected frequency or a plurality of selected frequencies which are selected from among a larger set of frequencies.

In an alternative embodiment, an RFID may be configured to change bits in its EPCglobal message in lieu of changing its frequency, and the change in bits corresponds to a change in the state of the corresponding component. In another alternative embodiment, the component includes a collection of coils designed to transmit different frequencies based on different states of the component. These different RF signals output by the different coils of the component then trigger different active RFID coils. For example, a first coil of the component may transmit at 60 Hz when the component is in a first state and a second coil transmits at 100 Hz. when the component is in a second state. An active RFID that is proximate to this component includes a coil that reflects a 60 Hz. RF signal and a second coil that reflects a 100 Hz. RF signal.

Figure 6:
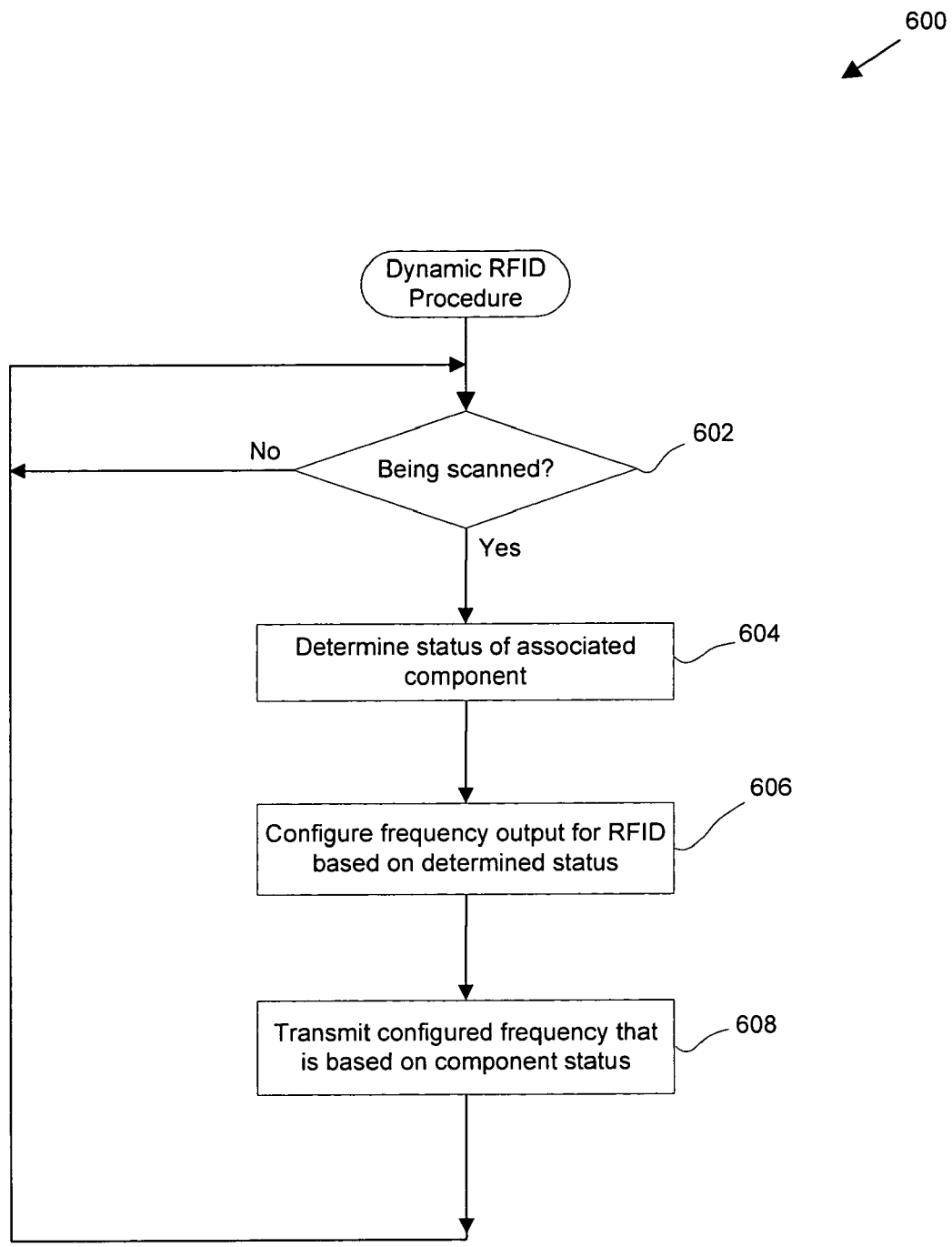
FIG. 6 is a flowchart illustrating a procedure for dynamically specifying an item's status state in accordance with an alternative embodiment of the present invention.

FIG. 6 is a flowchart illustrating a procedure 600 for dynamically specifying an item's status state in accordance with an alternative embodiment of the present invention. This procedure 600 will be described with respect to the dynamic RFID of FIG. 5. Initially, it can be determined whether the dynamic RFID tag is being scanned in operation 602. For example, the processor 504 and memory 506 of FIG. 5 are configured (or programmed) to receive input from the RF Scan Sensor 514 that indicates whether the dynamic RFID tag is being scanned by an RFID reader. When it is determined that the RFID tag is being scanned, the status of the associated component is then determined in operation 604. The frequency output for the RFID tag is then configured based on the determined status in operation 606. The configured frequency that is based on the component's status is then transmitted in operation 608. The dynamic RFID procedure then repeats.

In the implementation of a dynamic RFID tag of FIG. 5, memory 506 may include a Device Status and RFID Table 510 and a Current RFID register 512. The RFID register 512 is used to configure the RF Output 508 and is configured based on the Device Status and RFID Table 510. That is, the Table 510 lists a plurality of status states and associated RFID's. The current status is first obtained from the Status Sensing Hardware 502 and the Table 510 is then searched for a status that matches the current status. The RFID in the Table 510 that corresponds to the matching status is then used to configure the frequency of the RF Output 508 (e.g., by inputting a specific voltage).

Figure 7:
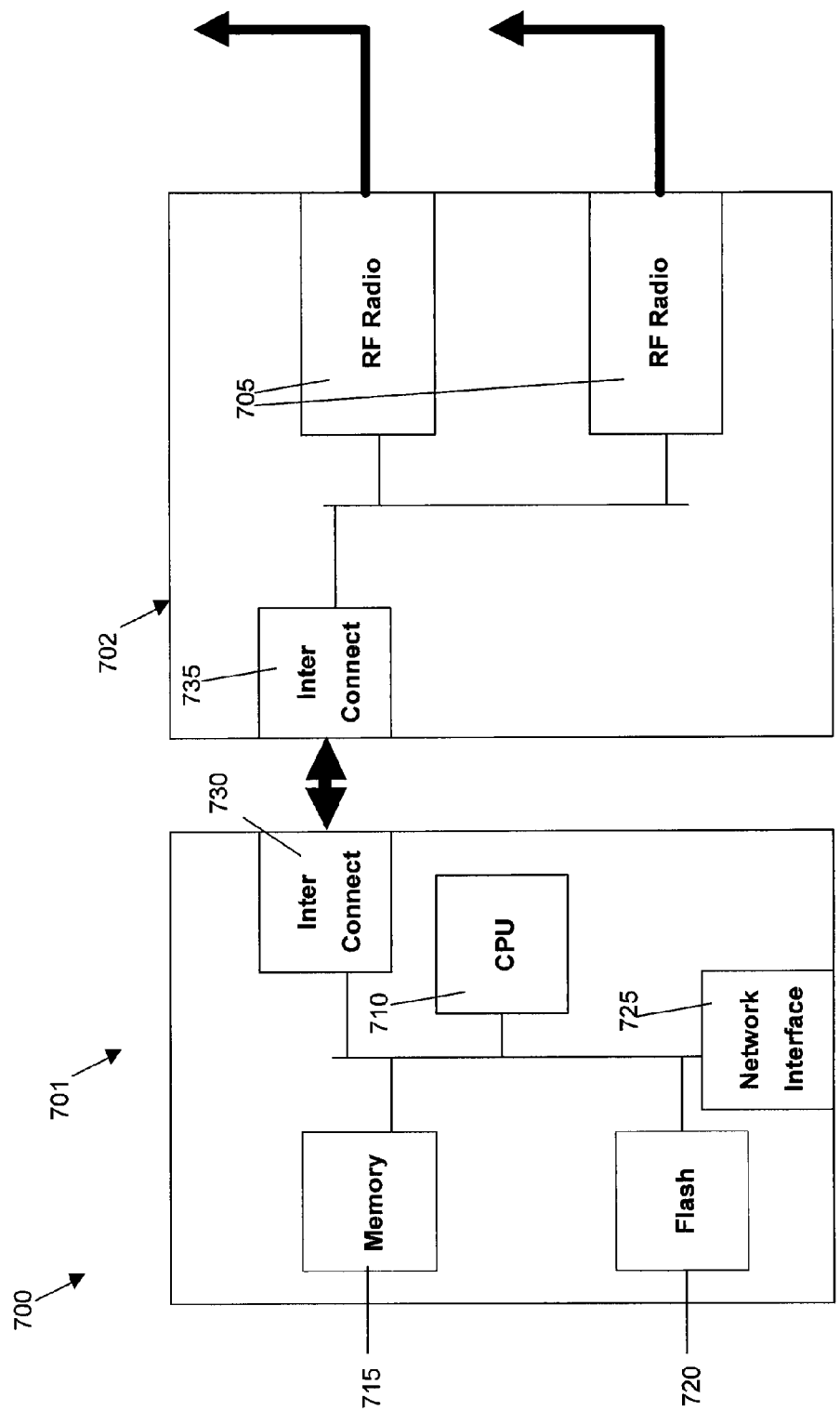
FIG. 7 is a block diagram that illustrates one embodiment of an RFID reader and a controller for scanning an active or dynamic RFID tag according to embodiments of the present invention.

The active and dynamic RFID tags of the present invention may be utilized to dynamically monitor the status of any product, item, set of items, or system. Any suitable RFID reader (and/or other processing systems) may be used to monitor such items. FIG. 7 illustrates system 700, including controller 701 and a "stripped down" version of RFID reader portion 702. Here, the intelligence for controlling RFID reader 702 resides in controller 701. RFID reader 702 includes one or more RF radios 705 for transmitting RF waves to, and receiving modulated RF waves from passive, dynamic, or active RFID tags. RF radios 705 provide raw RF data that is conveyed to controller 701 and converted by an analog-to-digital converter (not shown).

Interconnect 730 of controller 701 is configured for communication with interconnect 735 of RFID reader portion 702. The communication may be via any convenient medium and format, such as wireless, serial, point-to-point serial, etc. Network interface 725 may be any convenient type of interface, such as an Ethernet interface, for communicating with network, such as network 226 of FIG. 2.

In this example, CPU 710 may operate to control other devices according to software stored in local memory. In one implementation, CPU 710 is configured to communicate with other devices across a network, such as 226 of FIG. 2, e.g., to search ONS database 265 and to make at least a preliminary analysis of the results. Alternatively, information may be passed to another PC or server (e.g., 267 or 270 of FIG. 2) for analysis. CPU 710 may also operate to control output devices, such as a display or speaker. CPU 710 receives and processes user input from various input devices, such as a mouse, keypad, sensor, and/or microphone.

Flash memory 720 may be used to store a program (a "bootloader") for booting/initializing controller 701. The bootloader, which is usually stored in a separate, partitioned area of flash memory 720, also allows controller 701 to recover from a power loss, etc. As described in the RFID Networking Applications, some implementations of flash memory 720 include instructions for controlling CPU 710 to form DHCP (Dynamic host configuration protocol) DISCOVER requests to initiate a provisioning/configuration cycle. In some such implementations, flash memory 720 is used to store personality information and other configuration information obtained from, e.g., a DHCP server during such a cycle. However, such information is preferably stored in volatile memory 715 only after being received from, e.g., a DHCP server.

Figure 8:
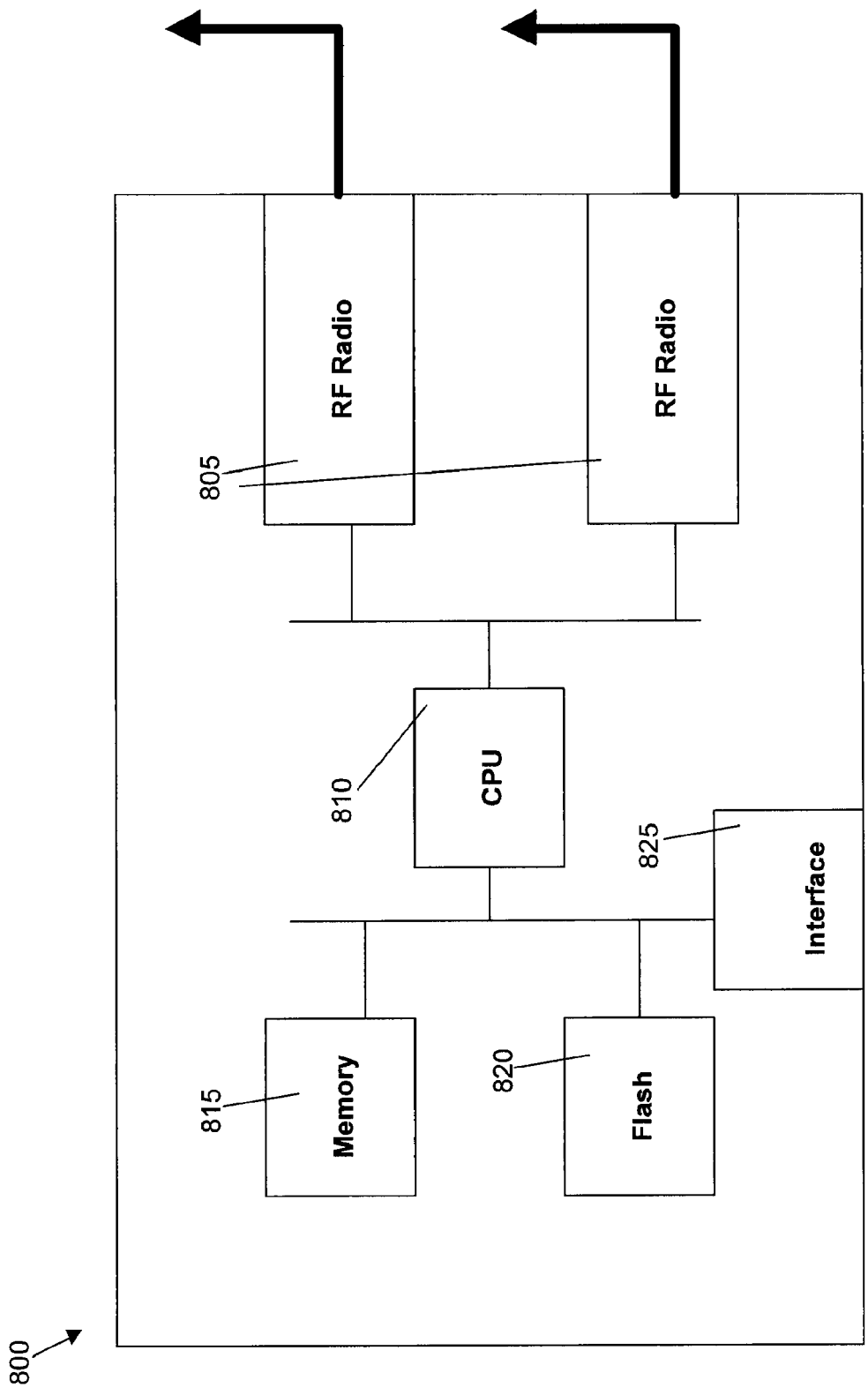
FIG. 8 is a block diagram of an exemplary RFID reader for scanning an active or dynamic RFID tag according to embodiments of the present invention.

FIG. 8 illustrates a relatively more intelligent RFID reader 800 that can be configured to perform methods of the present invention. RFID reader 800 includes one or more RF radios 805, as described above with reference to FIG. 7. Data from RF radios 805 may be stored, at least temporarily, by CPU 810 in memory 815 before being transmitted to controller 701 via interface 825. Flash memory 820 may be used to store a bootloader for initializing RFID reader 800.

Regardless of the configuration of various devices of the present invention (e.g., RFID reader or RFID tag), the device may employ one or more memories or memory modules configured to store data, program instructions for the general-purpose network operations and/or the inventive techniques described herein. The program instructions may control the operation of an operating system and/or one or more applications, for example. The memory or memories may also be configured to store obtained RFID tag data, reference RFID tag information and corresponding status states, current RFID output by an RFID or sensed by an RFID reader, etc.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks and DVDs; magneto-optical media such as floptical disks; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files containing higher level code that may be executed by the computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

What is claimed is:

1. An apparatus for dynamically conveying a status state of a system, comprising:
   one or more active radio frequency identification (RFID) tags, wherein each active RFID tag is positioned with respect to a corresponding one of the system's electrically powered components so that each active RFID tag transmits a particular frequency when the corresponding component is operating and does not transmit the particular frequency when the corresponding component is failing to operate,
   wherein transmission or failure of transmission of each RFID tag indicate the system's status state.

2. An apparatus as recited in claim 1, further comprising a passive RFID tag that corresponds to the system's identity.

3. An apparatus as recited in claim 1, wherein each active RFID tag is positioned in a power path of its corresponding component.

4. An apparatus as recited in claim 1, wherein each active RFID tag is not physically tied to a power line of its corresponding component, wherein each active RFID tag includes a coil that is continually responsive to an RF signal output by its corresponding component when the component is operational.

5. An apparatus for dynamically transmitting a status state of an item, comprising:
   a radio frequency (RF) transmitter for dynamically outputting a selected one of a plurality of frequencies;
   one or more processors;
   one or more memory, wherein at least one of the processors and memory are adapted for:
   determining a status of the item; and
   configuring the RF transmitter to output a selected one of the plurality of frequencies based on the determined status of the item.

6. An apparatus as recited in claim 5, further comprising an RF scan sensor for determining whether the item is being scanned by a radio frequency identification (RFID) reader and wherein the at least one of the processors and memory are further adapted for:
   determining whether the item is being scanned by an RFID reader, and
   wherein the status of the item is only determined and the RF transmitter is only configured when it is determined that the item is being scanned.

7. An apparatus as recited in claim 5, wherein the RF transmitter is a plurality of piezoelectric devices.

8. An apparatus as recited in claim 5, wherein the RF transmitter is a tunable oscillator.

9. An apparatus as recited in claim 5, wherein the memory includes a Device Status and RFID Table that lists a plurality of status states that each correspond to a particular RFID frequency, and wherein the RF transmitter is configured with an RFID frequency that corresponds to a status from the Table matching the determined status of the item.

10. An apparatus as recited in claim 5, wherein the at least one of the processors and memory are adapted for configuring the RF transmitter to output a plurality of selected frequencies selected from the plurality of frequencies based on the determined status of the item.

11. An apparatus as recited in claim 5, wherein the RF transmitter includes a plurality of coils tuned to different frequencies and configuring the RF transmitter is accomplished by applying power to a selected one of a plurality of coils associated with the item, wherein each item coil triggers a different one of the RF transmitter's coils.

12. A method of dynamically conveying a status state of an item, comprising:
   determining a status state of the item;
   configuring an RF transmitter to transmit a selected one of a plurality of frequencies based on the determined status state of the item;
   determining whether the item is being scanned by an RFID reader, and
   wherein the status state of the item is only determined and the RF transmitter is only configured when it is determined that the item is being scanned.

13. A method of dynamically conveying a status state of an item, comprising:
   determining a status state of the item; and
   configuring an RF transmitter to transmit a selected one of a plurality of frequencies based on the determined status state of the item, wherein configuring the RF transmitter is accomplished by:
   comparing the determined status state to a plurality of reference status states that each correspond to a specific REID frequency; and when a match is found between the determined status state and the reference status state, configuring the RF transmitter with the REID frequency corresponding to the matching reference status state.

14. An apparatus for dynamically tracking a status state of an item, comprising:
  a first radio frequency (RF) radio for outputting a plurality of frequencies;
  a second RF radio for receiving one or more scanned frequencies from an item;
  one or more processors;
  one or more memory, wherein at least one of the processors and memory are adapted for:
    scanning a proximate item with the first RF radio by outputting one or more frequencies to thereby obtain an RFID frequency that is received by the second RF radio;
    comparing the obtained RFID frequency to stored reference RFID frequencies; and
    determining the status state of the scanned item based on the comparison.

15. An apparatus as recited in claim 14, wherein the stored reference RFID frequencies were previously obtained using the first and second RF radios to scan a plurality of items having known status states.

16. A method for dynamically tracking a status state of an item, comprising:
  scanning a proximate item with a radio frequency identification (RFID) reader to obtain an RFID frequency;
  comparing the obtained RFID frequency to a plurality of stored reference RFID frequencies; and
  determining the status state of the scanned item based on the comparison.

17. A method as recited in claim 16, wherein the stored reference RFID frequencies were previously obtained using the RFID reader to scan a plurality of items having known status states.

18. An apparatus for dynamically tracking a status state of an item, comprising:
  means for scanning a proximate item to obtain an RFID frequency;
  means for comparing the obtained RFID frequency to a plurality of stored reference RFID frequencies; and
  means for determining the status state of the scanned item based on the comparison.

* * * * *